United States Patent
Nevo et al.

(10) Patent No.: US 12,010,389 B2
(45) Date of Patent: Jun. 11, 2024

(54) SYSTEM AND METHOD FOR INTELLIGENT WEB BASED VIDEO PLAYING

(71) Applicant: Qognify, Ltd., Ra'anana (IL)

(72) Inventors: Eran Nevo, Kfar Saba (IL); Marina Beiser Klotsman, Kfar Saba (IL); Gina Fahimipoor, Kiryat Ono (IL); Yaniv Toplian, Kfar Saba (IL)

(73) Assignee: Qognify, Ltd., New York, NY (US)

( * ) Notice: Subject to any disclaimer, the term of this patent is extended or adjusted under 35 U.S.C. 154(b) by 0 days.

(21) Appl. No.: 18/463,853

(22) Filed: Sep. 8, 2023

(65) Prior Publication Data

US 2024/0147012 A1 May 2, 2024

Related U.S. Application Data

(60) Provisional application No. 63/416,173, filed on Oct. 14, 2022.

(51) Int. Cl.
*H04N 21/472* (2011.01)
(52) U.S. Cl.
CPC .............. *H04N 21/47217* (2013.01)
(58) Field of Classification Search
CPC .................................. H04N 21/47217
See application file for complete search history.

(56) References Cited

U.S. PATENT DOCUMENTS

2020/0145701 A1\* 5/2020 Liu .................. H04N 21/84
2023/0071445 A1\* 3/2023 Luo ................. H04N 21/431

FOREIGN PATENT DOCUMENTS

| CN | 115665474 A | 1/2023 |
| CN | 115665484 A | 1/2023 |
| CN | 115695401 A | 2/2023 |

OTHER PUBLICATIONS

HTML Standard Video Element 5; https://html.spec.whatwg.org/muitipage/media.html#video, printed on Dec. 15, 2023.
World Wide Web Consortium, https://en.Wikipedia.org/w/index.php?title=World_Wide_Web_Consortium&oldid=1187934897, printed on Dec. 15, 2023.

\* cited by examiner

*Primary Examiner* — Thai Q Tran
*Assistant Examiner* — Jose M Mesa
(74) *Attorney, Agent, or Firm* — PEARL COHEN ZEDEK LATZER BARATZ LLP

(57) ABSTRACT

A computerized system and method may provide a dynamic, adaptable, and robust framework for intelligent web-based video playing. A computerized system including a memory and a computer processor may arrange a plurality of video frames based on one or more data items associated with groups of pictures (GOPs) and/or video playing commands and/or settings, and render and/or play the arranged frames on an output display. Functionalities enabled by different embodiments of the invention include, for example: automatically adjusting a video playing speed according to a number of accumulated frames within a memory buffer; appending a memory buffer with frames included in another (e.g., separate) memory buffer based on a requested video playing direction; omitting frames from a video sequence (thus sparing the need to process omitted frames) based on quantifying their information content and/or distance from reference frames; and synchronizing video playing on different (e.g., remote) computer systems.

18 Claims, 8 Drawing Sheets

SYSTEM AND METHOD FOR INTELLIGENT WEB BASED VIDEO PLAYING

The present application claims benefit from prior provisional application 63/416,173 filed on Oct. 14, 2022, entitled SYSTEM AND METHOD FOR WEB PLAYER AND VIDEO STREAMING, incorporated by reference herein in its entirety.

FIELD OF THE INVENTION

The present invention relates to video streaming and playing technologies, and more specifically to intelligent live video streaming and playback systems.

BACKGROUND OF THE INVENTION

Playing video over the web presents several significant challenges to be addressed for a seamless and high-quality user experience. One of these challenges relates to the variability in network conditions and bandwidth availability and to efficiently delivering video content across different network speeds, including slower connections or congested networks. In this context, ensuring smooth video live streaming and video playback and minimizing buffering disruptions require robust buffering, adaptive streaming algorithms, and efficient video compression techniques.

Another challenge relates to the wide range of devices and platforms used for web video playback. The diversity among video playing devices, including desktops, laptops, smartphones, tablets, and smart TVs, entails various compatibility issues and fragmentation. Video players and streaming technologies must be capable of consistently delivering content across different operating systems, browsers, and device capabilities while maintaining consistent quality and user experience.

Achieving interoperability between, e.g., different video codecs and formats poses yet another fundamental challenge. Various codecs and file formats exist, and ensuring broad compatibility and cooperability across different platforms and devices (which may be, e.g., working simultaneously, or in parallel) may require complex algorithmic solutions which are prone to various errors and failures.

Addressing these challenges requires continuous innovation in video streaming technologies, adaptive algorithms, network optimization, and related fields.

SUMMARY OF THE INVENTION

A computerized system and method may provide a dynamic, adaptable, and robust framework for intelligent web-based video playing. A plurality of remotely connected computer systems (each including, e.g., a computer processor and a memory) may communicate over a communication network and arrange a plurality of video frames or groups of pictures (GOPs) based on a plurality of data or metadata items—which may be or may include, for example, video playing commands, messages or requests associated with one or more GOPs and/or video playing settings—and for rendering and/or playing the arranged frames or resulting video stream or sequence on an output display.

Based on various frame data and metadata processing operations and/or additional calculations, some embodiments of the invention may enable desirable video playing functionalities, such as for example: automatically adjusting a video playing speed according to a number of accumulated frames within a memory buffer; appending a memory buffer with frames included in another (e.g., separate) memory buffer based on a requested video playing direction; omitting frames from a video sequence (thus sparing the need to process omitted frames) based on quantifying their information content and/or distance from reference frames; and synchronizing video playing on different (e.g., remote) computer systems.

Some embodiments of the invention may combine advanced video playing and/or network communication protocols and/or additional calculations and processing operations to provide intelligent frame dropping (IFD) and/or intelligent latency control (ILC) procedures that may allow, for example, to automatically and dynamically modify or alter video playing settings according to various conditions and constraints (such as for example achieving a desirable balance between computational processing cost and video playing quality).

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features, and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Figure 1:
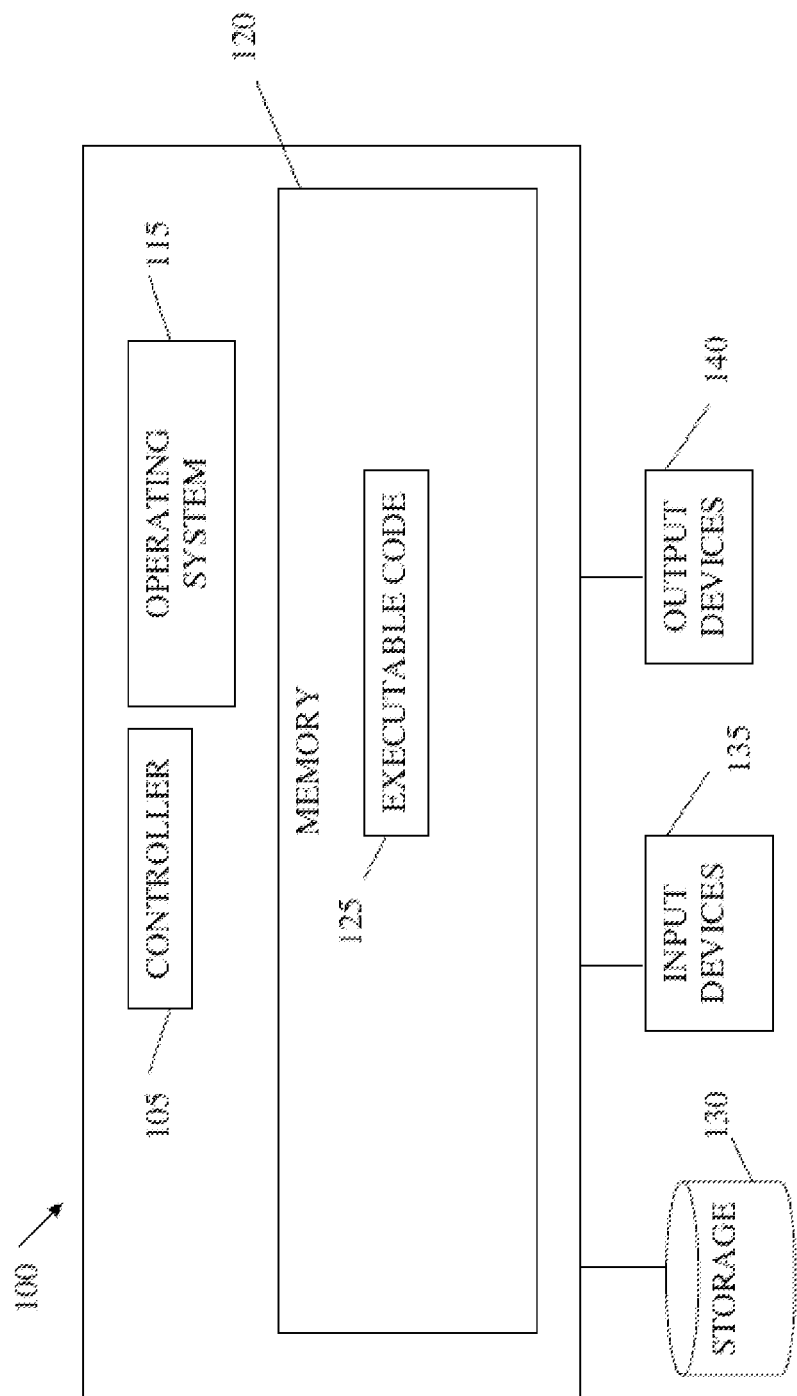
FIG. 1 is a high-level block diagram of an exemplary computing device which may be used with embodiments of the invention.

FIG. 1 shows a high-level block diagram of an exemplary computing device which may be used with embodiments of the invention. Computing device 100 may include a controller or processor 105 (or, in some embodiments, a plurality of processors) that may be, for example, a central processing unit processor (CPU), a graphics processing unit (GPU), a chip or any suitable computing or computational device, an operating system 115, a memory 120, a storage 130, input devices 135 and output devices 140 such as a computer display or monitor displaying for example an output display or a computer desktop system. Each of the procedures and/or calculations discussed herein, and the modules and units discussed, such as for example those included in FIGS. 3-8, may be or include, or may be executed by, a computing device such as included in FIG. 1, although various units among these modules may be combined into one computing device.

Operating system 115 may be or may include any code segment designed and/or configured to perform tasks involving coordination, scheduling, arbitration, supervising, controlling or otherwise managing operation of computing device 100, for example, scheduling execution of programs. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may store for example, instructions (e.g. code 125) to carry out a method as disclosed herein.

Executable code 125 may be any executable code, e.g., an application, a program, a process, task or script. Executable code 125 may be executed by controller 105 possibly under control of operating system 115. For example, executable code 125 may be one or more applications performing methods as disclosed herein, for example those of FIGS. 3-8 according to embodiments of the invention. In some embodiments, more than one computing device 100 or components of device 100 may be used for multiple functions described herein. For the various functions described herein, one or more computing devices 100 or components of computing device 100 may be used. Devices that include components similar or different to those included in computing device 100 may be used, and may be connected to a network and used as a system. One or more processor(s) 105 may be configured to carry out embodiments of the invention by for example executing software or code. Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data describing one or more remote computing devices, as well as additional and/or different data items, may be stored in a storage 130 and may be loaded from storage 130 into a memory 120 where it may be processed by controller 105. In some embodiments, some of the components shown in FIG. 1 may be omitted.

Input devices 135 may be or may include a camera, video camera, joystick, mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100, for example, a wired or wireless network interface card (NIC), a modem, printer or facsimile machine, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out functions, methods and procedures as disclosed herein.

Video playing settings or preferences as used or as referred to herein may denote not only "subjective" video playback preferences (such as, e.g., a human user simply "wishing" to play a video in double speed), but also, for example, a computer system having technical specifications which may necessitate or entail "objective" preferences, settings, or constraints on video playback related operations (such as for example a computer system in which, e.g., a video must be played while not exceeding computer processing capabilities) as may be described and/or documented in appropriate data structures such as, e.g., described herein.

Embodiments of the invention may include or involve a plurality of computer systems that may be remotely connected through a data or communication network. Such computer systems may be, e.g., senders or receivers of video frame data and/or additional data or metadata. In this context, a sender computer system, which may be, e.g., a streamer server, may transmit individual image frames or groups of frames, also referred to as groups of pictures (GOPs). In some embodiments, a GOP may include image data and additional data or metadata, which may describe or reference a group of frames to which a particular frame belongs. In other embodiments, additional data or metadata may be included in a GOP as data items separate from video frames.

The metadata may provide information for, e.g., receiving, decoding, arranging, and processing the video frames, e.g., by a receiver computer, which may for example be responsible for rendering and playing a video file or sequence. In addition, computer systems used or included in different embodiments of the invention may send or transmit (or otherwise receive and process) various video playing related commands, messages, or requests. Video frame or GOP data or metadata, as well as various commands, messages, and requests, may be stored as data items in appropriate databases or data stores (which may be for example included in the computer systems involved in video playing, or in a different $3^{rd}$ party database). Some embodiments of the invention may thus manage video playing (which may for example take place over the network, e.g., as described herein) procedures or operations, for example, based on the stored data items, e.g., according to some of the examples provided herein.

In some embodiments of the invention, video and/or image and/or audio data may be or may include, for example, MP4, AVI, FLV, WMV, MOV, and MPEG data. However, different data structures and/or formats known in the art may be used in different embodiments.

Figure 2:
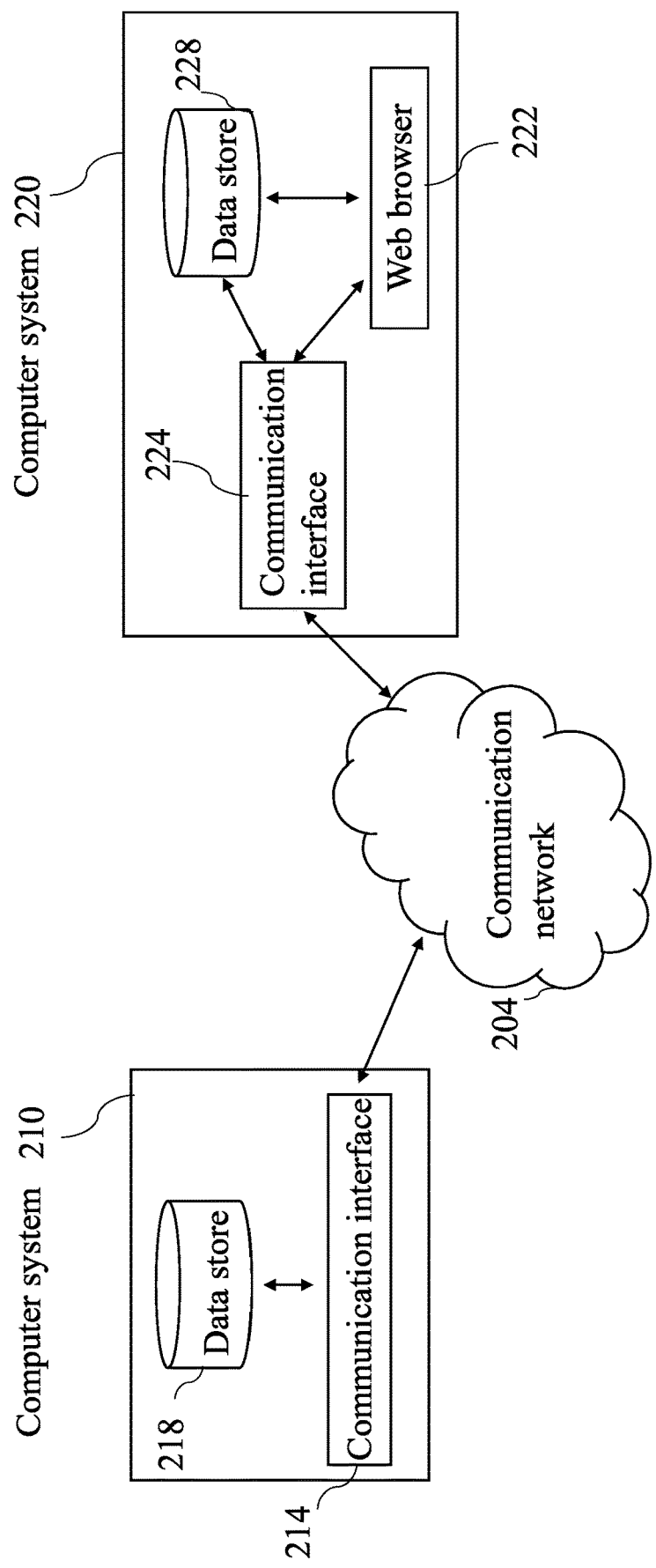
FIG. 2 shows an example sender and receiver computer systems remotely connected by a data network according to some embodiments of the invention.

FIG. 2 shows an example sender and receiver computer systems remotely connected by a data network according to some embodiments of the invention. Remote computer 210 (e.g., a sender or streamer server computer) may send or transmit, over communication or data network 204, data items such as for example a plurality of video frames or GOPs, data or metadata associated with some or all of the frames, and/or audio data which may for example be synced or associated with the plurality of video frames—to computerized system 220 (e.g., a receiver computer which may play the received video stream, and which may also be referred to as a "client"). Each of systems 210 and 220 may be or may include the various components described with reference to system 100, as well as other computer systems, and include and/or operate or perform, e.g., the various corresponding protocols and procedures described herein. In some embodiments, computerized systems 210 and 220 may additionally perform a plurality of operations including for example sending and/or transmitting and/or collecting and/or receiving additional data to or from additional remote computers systems. In some embodiments of the invention, one or more computer systems such as for example a receiver computer may be, e.g., operated or associated with a user wishing to play a video file or stream using for example a web browser 222 (such as, for example, Google Chrome, Mozilla Firefox, Microsoft Edge, and the like; although different browsers and/or appropriate user interfaces may be used in different embodiments of the invention). One skilled in the art may recognize that additional and/or alternative remote and/or computerized systems and/or network and connectivity types may be included in different embodiments of the invention.

In some embodiments of the invention, computer systems 210 and 220 may communicate via data or communication or data network 204 via appropriate communication interfaces 214 and 224, respectively—which may be for example NICs or network adapters as known in the art. As discussed herein, receiver and sender computers such as, e.g., computer systems 210 and 220 may send or transmit video frames and/or associated data using appropriate network communication protocols such as for example Realtime Transport Protocol (RTP) and/or Real Time Streaming Protocol (RTSP) and/or Transmission Control Protocol (TCP)—although other network and/or data packet communication protocols known in the art may be used in different embodiments. Computerized systems 210 and/or 220 may include data stores such as, e.g., 218 and 228 which may for example include a plurality of received video frames and/or metadata, as well as video playing related commands, messages, or requests as further described herein.

The plurality of computer systems used in different embodiments of the invention (including, for example, sender computers, receiver computers, and recorder systems) may, in some embodiments of the invention, use or support encrypted and non-encrypted communication (such as for example HTTP, HTTPS, WebSocket, and the like, which may include or involve, e.g., the use of appropriate hash functions), or a combination of encrypted and non-encrypted communication protocols using, e.g., a plurality of communication channels, networks, and/or threads.

In some embodiments, a sender computer (such as, e.g., computer system 210) may be a streamer server, which may receive or fetch video content from a remote or physically separate computer system (which may be, e.g., a recorder system such as for example an internet camera and/or additional or alternative input/output components) using network communication protocols such as for example ones discussed herein. In other embodiments, a sender computer may itself include video recording or generating components.

In some embodiments of the invention, video playback or live video streaming may be initiated or requested by a receiver computer (such as for example computer system 220, using for example a web browser or appropriate user interface) sending an appropriate command or request to a sender computer (e.g., computer system 210). The sender computer receiving the command may then, for example, establish network communication with a recorder system while simultaneously communicating with the receiver computer—using communication protocols such as, e.g., described herein. In some embodiments, data packets (which may include, e.g., video frames and/or data or metadata associated with such frames) may be sent or transmitted by the sender computer using a channel, network, or thread different than that used for sending or transmitting commands, messages, or requests by the receiver computer (which may be desirable, for example, in cases of live video streaming, where streaming of video content may be kept uninterrupted by commands from the requester computer). In other embodiments, data packets may be sent or transmitted by a sender computer using the same channel, network, or thread used for transmitting commands by the receiver computer (which may be desirable, e.g., for video playback—where the requester computer may for example send or transmit commands to alter or modify the sending of data packets and/or associated video frames and/or metadata by the sender computer which may take effect immediately. In this context, some embodiments may use a single thread for both commands and data flow, e.g., in order to create conjunction control which may for example also be implemented in a recorder system, such that the receiver computer or client may send requests or commands and wait for an appropriate response). Different communication schemes and procedures using various combinations of data packet protocols, and/or communication channels or threads, are known in the art and may be used in different embodiments of the invention.

In some embodiments of the invention, a sender computer (such as for example computer system 210) may communicate and/or access a recorder system and provide and/or collect information for stream or data transfer construction which may for example be included in requests or commands and/or in frame or GOP data or metadata such as described herein (which may include, for example, relevant tokens and/or communication channel information, preferred communication protocols and/or packet sizes (e.g., in bytes) or rates (e.g., in Hz), and/or setting a time for packet transmissions; various additional or alternative operations may be used or included in different embodiments).

In some embodiments, various computer systems (including, for example, sender computers, receiver computers, and recorder systems) may be mapped to an appropriate or specific communication channels among a plurality of channels (such as for example ones enabling secure or encrypted network communication as described herein), e.g., before the sending, fetching or transmitting of video stream or data transfer related commands (such as for example requesting, by a receiver computer, video or media content, data or metadata from a given sender computer). The mapping of computer system to communication channels may be performed, e.g., by one of the relevant computer systems (such as for example a sender, receiver, or recorder computer) or by a separate computer system or server. In this context, many channel mapping techniques known in the art of network communication may be used in different embodiments of the invention.

As used herein, "image data", "frame (or GOP) data (or metadata)", "video playing requests (or commands)", "data items" or "metadata items" may generally refer to data items that may be associated with or describe a plurality of frames (or GOPs) and/or a plurality of video playing settings, that may be sent and/or transmitted and/or received and/or stored by the various computer systems (such as for example sender computers, receiver computers, recorder systems, and the like)—and that may be used in determining settings for playing a video file or stream, and in particular in determining how video frames are arranged (and, accordingly, rendered and played) e.g., as part of the various video playing protocols and procedures described herein. Thus, one skilled in the art would recognize that while one type of data item may be referred to by way of example—additional or alternative data items may be used in different embodiments of the invention, and that at least in some cases terms such as, e.g., "image data", "frame (or GOP) data (or metadata)", and "video playing requests (or commands)" may be used interchangeably herein.

In some embodiments of the invention, frame or GOP data or metadata, or data items, may be sent, transmitted, received, or processed by different computer systems (such as for example by a receiver computer, as well as, e.g., by a sender computer or recorder system) and may be, e.g., in JSON format such as for example:

Packet #N{
FrameType: (int)
Time: (time)
Resolution: (int*int)
FrameRate: (int)
CompressionType: (int)
DataSize: (int)
MediaPacketType: (int)
SequenceNumber: (int)
Bitrate: (int)
GOPSize: (int)
Profile: (int)
. . .
}

Where, for example, N may be a serial number or identifier of a specific data packet or a range of multiple packet numbers among a plurality of data packets; int may be an integer, FrameType may denote different frame types included in the packet (such as for example I-frames, P-frames, or a combination of I-frames and P-frames—see discussion herein regarding such frame types); Time may refer to a specific timestamp for sending a given data packet; Resolution may refer to an image resolution (e.g., as may be represented by an array of pixels) of the video stream or file under consideration; FrameRate may be the frame rate (e.g., in Hz) describing or associated with a given stream or video file; CompressionType may refer to, e.g., one of a plurality of data or video compression methods used for the stream under consideration (such as for example H.264/AVC, VP9, Xvid:Xvid, H.264/H.265, and/or other video compression protocols or standards known in the art); DataSize may be, e.g., the size (e.g., in bytes) of the packet or video file or stream under consideration; MediaPacketType may refer to, e.g., one of a plurality of data packet types used for the stream under consideration (such as for example RTP, RTSP or TCP packets; alternative packet types may be used in different embodiments); SequenceNumber may refer to a serial number or identifier of a specific sequence of data packets, frames, or of GOPs among a plurality of sequences; Bitrate may refer to the bit rate (e.g., in bytes per second) for the video or stream considered; GOPSize may refer to, e.g., a number of frames in the relevant GOP with which the data packet may be associated; and Profile may refer to a set of data transfer or video stream settings or preferences among a plurality of sets of settings used or employed in the particular video stream under consideration.

Commands and/or messages and/or requests that may be sent, transmitted, received, or processed by different computer systems (such as for example by a receiver computer, as well as, e.g., by a sender computer or recorder system) may include a plurality of request parameters (which may describe or be associated with, for example, a plurality of video playing preferences and/or settings) and may be, e.g., in JSON format such as for example:

Command #X{
Command_type: (int)
Media_Provider_ID: (int)
Media_Requester_ID: (int)
Media_Recorder_ID: (int)
Media_Source: (string)
Sending_time: (time)
Execution_time: (time)
. . .
} where, for example, X may be a serial number or identifier of a specific command or request, Command_type may be a number denoting, e.g., one or more of the video playing related operations and/or settings and/or preferences considered herein (such as for example ones associated with live video or video playback; forward or backward playing; playing speed or rate; video or image resolution; audio quality; seeking or searching or "jumping" to a specific time within a video file, and the like); Media_Provider_ID, Media_Requester_ID, and Media_Recorder_ID may be identifiers for a video provider (such as, e.g., a sender computer or streamer server), for a requester (such as e.g. a receiver computer) and for a recorder (such as e.g. a computer system and/or dedicated hardware system) respectively; Media_Source may be a string denoting or referring to a file name or stream played or requested; Sending_time may be a timestamp associated with the sending of the command or request; Execution_time may be a requested time to execute the command or request, and so forth.

Additional and/or alternative parameters and/or fields and/or variables as well as additional or alternative data structures and formats for commands, messages, or requests, or for frame data or metadata may be used in different embodiments of the invention.

Some example commands, messages, or requests which may be used in some embodiments of the invention may include, e.g.: receiver computer R requesting forward (or backward) video playback of file F from sender computer S starting immediately, R requesting forward (or backward) video playback F from sender computer S at an execution time t, R requesting S to change playback direction (e.g., from forward playback to backward playback or vice versa), R requesting S to pause or resume video playback or live video, R requesting live video from S using a specific recorder Re1, or using two recorders Re1 and Re2, and the like. One skilled in the art may recognize different commands and/or messages and/or requests may be used in different embodiments of the invention.

Embodiments of the invention may arrange a plurality of video frames based on data or metadata items. In some embodiments, data or metadata items may be associated, for example with a plurality of GOPs and/or video playing settings. Some embodiments of the invention may thus sort, manage or arrange a plurality of video frames or GOPs—e.g., based on data or metadata items associated with a plurality of GOPs and/or video playing settings, and render and/or play the arranged frames (e.g., on an output display of a receiver computer such as computer system 220) according to the various protocols and procedures described herein. In such manner, embodiments of the invention may enable various useful video playing functionalities based on, e.g., information included in video frame or GOP data or metadata, and/or information included in video playing requests or commands. Arranging frames may include, for example, setting or changing the order of a series of video frames to be displayed as compared to an original order; changing the position of a frame within a series of frames; removing frames; adding frames; or other functions.

Figure 3:
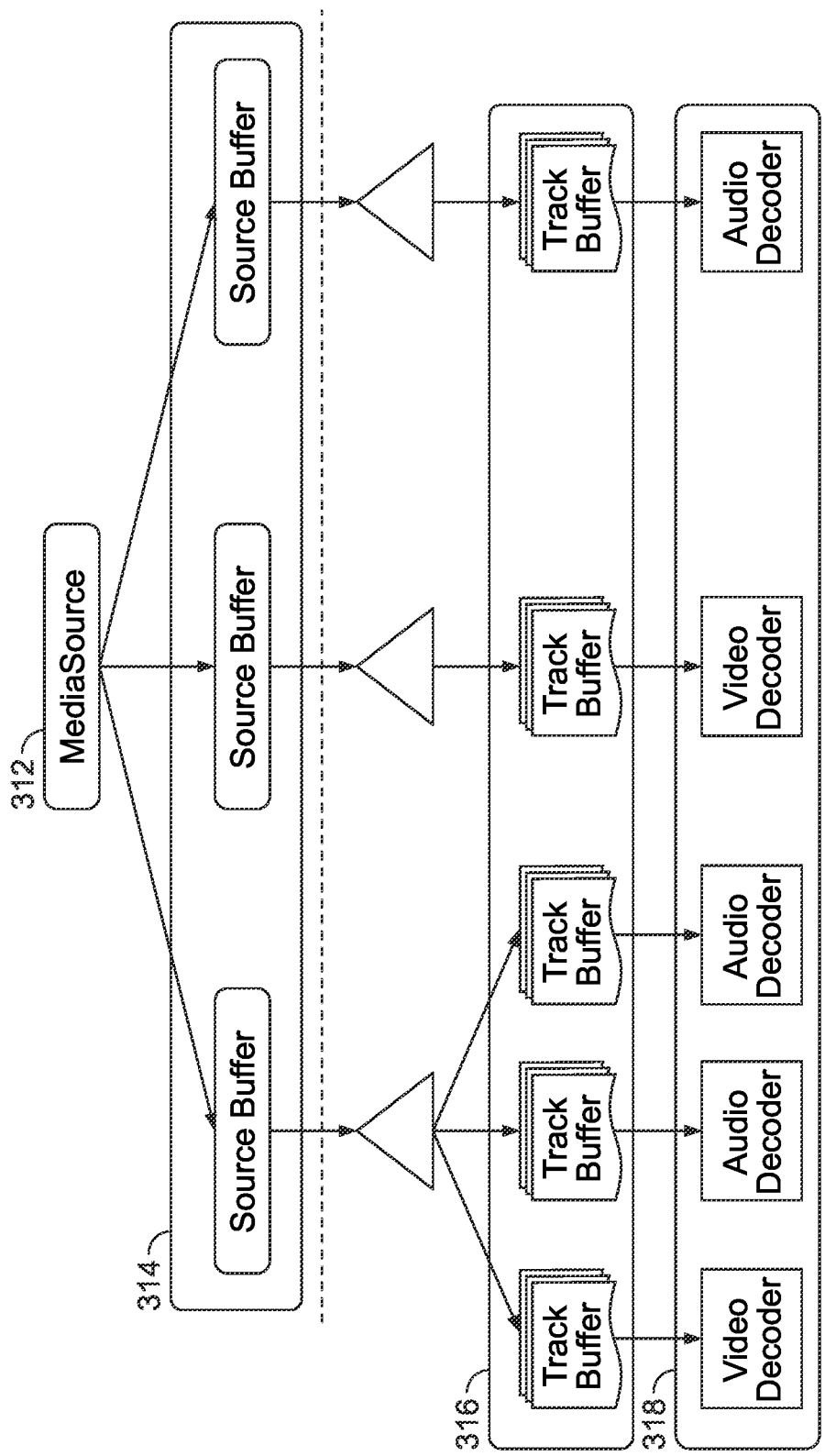
FIG. 3 is a flowchart depicting an example video playing workflow according to some embodiments of the invention.

FIG. 3 is a flowchart depicting an example video playing workflow according to some embodiments of the invention. In this figure (which may describe, for example, HTML 5 embedded video element based specifications for video playing within a web page), line 310 separates items which may be input or controlled by a user (which may be for example a receiver computer; above the line), and items which are given as "black boxes" (e.g., within the embedded video element) and cannot be controlled in a similar manner. Thus, FIG. 3 depicts a video playing framework in which a user may have, for example, control over choosing or selecting media source 312 (such as for example a video stream or file on a remote sender computer system or server) and over source buffers 314 connected to this media source (which may represent a video, audio or media data, such as for example a part of a video file received by a receiver computer from a given sender computer), while having no control, for example, over track buffering, as well as over audio and video decoding and rendering (which may, e.g., imply or require control over track buffers 316, video decoders 318, and/or additional components). Using a framework such as depicted in FIG. 3, a user may have little control, for example, over the relationship between video playing quality and computational efficiency or performance considerations. For instance, one may consider a video stream played at an original, standard frame rate of 30 frames per second (FPS), in which each frame may be displayed for approximately 33 milliseconds (ms). If, however, a user adjusts the playing speed of the video stream to double (×2) or quadruple (×4) using the approach depicted in FIG. 3—the same number of frames may be displayed throughout the playback of the video stream, and each frame may be displayed for only 16 ms or 8 ms, respectively. Such accelerated display of frames may pose a higher processing demand on the video element, thereby potentially impacting the overall performance of the web page. The increased workload can lead to decreased responsiveness or slower execution of other page components, which may result, e.g., in a suboptimal user experience. Some embodiments of the invention may address such challenges, e.g., using protocols and procedures such as further described herein.

In some embodiments, a video playing entity such as, e.g., receiver computer may include an internal structure which may be referred to herein as a Media Handler (or MH), which may for example manage, store, organize and arrange video frames received from an external source (such as, e.g., a sender computer and/or a recorder system) in computer memory to enable decoding, processing, rendering, and playing of the corresponding video content. The managing, arranging, and organizing of the received video frames by the MH may be performed based on, e.g., video or GOP data or metadata such as for example described herein.

Figure 4:
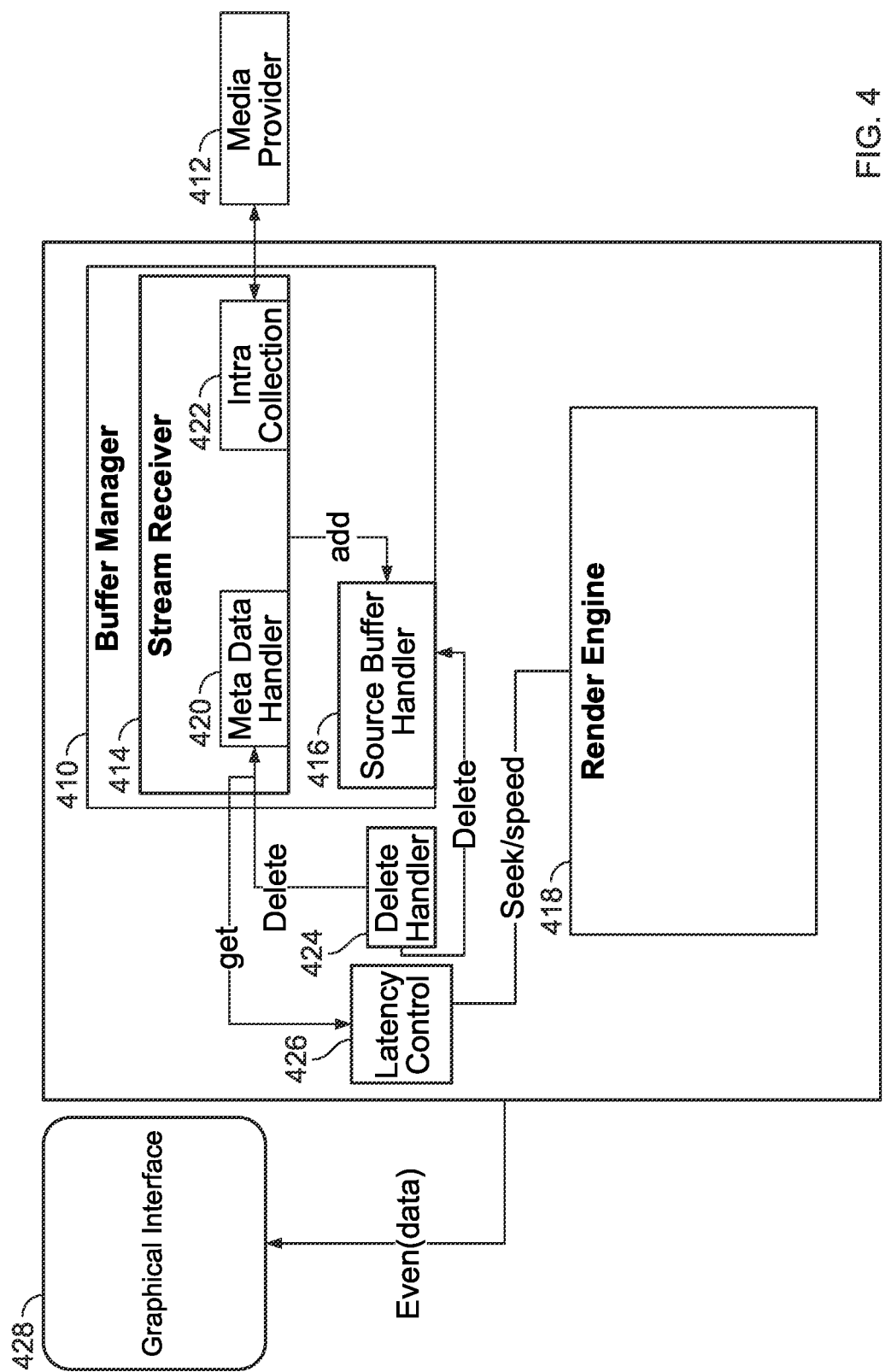
FIG. 4 is a high level block diagram of an example media handler structure according to some embodiments of the invention.

FIG. 4 is a high level block diagram of an example media handler structure according to some embodiments of the invention. MH may include a buffer manager component 410 to store, organize, and arrange video frames received from an external source or media provider 412 (such as for example a sender computer). Buffer manager 410 may, in some embodiments, include a stream receiver 414—which may, for example, collect a plurality of incoming frames or GOPs from a sender and and/or generate appropriate error messages, e.g., in cases frames were not received successfully according to various formats and/or procedures known in the art. The buffer manager may include a source buffer handler 416, which may, e.g., organize or arrange the received frames or GOPs and, for example, prepare them for rendering and/or playing by an appropriate render engine 418. In some embodiments, stream receiver 414 may include a metadata handler 420 to receive and/or store frame data or metadata and/or request or command data as described herein, and, for example, a dedicated intra-collection component 422 to collect and/or store and/or manage I-frames and or I-frame metadata (e.g., separately from P-frames; which may be desirable for example for applying intelligent frame dropping procedures exclusively to P-frames; see also further discussion herein). By appropriately arranging and/or selecting frames (for example, based on frame or GOP data or metadata, as discussed in various examples herein), source buffer handler 416 may enable desirable video playback, for example according to the various protocols and procedures described herein.

In some embodiments, buffer manager components may include or may communicate with a delete handler component 424, which may be used for removing or deleting frames from the computer memory that are no longer required for processing or rendering, e.g., based on frame data or metadata as further described herein. Buffer manager subcomponents may also include, or may communicate with, a latency control component 426 which may further arrange and/or select frames for video playback for example based on frame data or metadata and/or based on latency considerations and/or constraints as further described herein.

MH may include a render engine 418 which may, for example, perform various post-processing operations (such as for example video masking such as, e.g., further discussed herein and/or de-warping and/or interlacing and/or digital zoom related operations, and the like) on frames processed, and/or arranged, and/or selected by buffer manager 410 and/or delete handler 424 and/or latency control 426, e.g., according to the various protocols and procedures further described herein. In some embodiments, render engine 418 may for example render and play the processed and/or arranged frames according to various specifications and/or settings (such as for example the Video Element specifications associated with HTML5) on an output display, as known in the art. Rendering engine 418 may transmit, send or transfer the rendered video to a player or graphical interface component 428 (which may be for example web browser 222 discussed herein), where, for example, a user may provide input to rendering engine 418 and/or to web browser 222 or an alternative user interface included in a corresponding computer system to perform various playback control related operations (such as, e.g., scrolling or seeking, changing playback speed, forward or backward playing, pausing or resuming playback, performing various restrictions on a given video stream or playback, trigger video masking, and the like) using appropriate controls on a graphical user interface as known in the art.

In some embodiments, some or all MH components may be separate and discrete software modules and/or hardware components—while in other embodiments, a plurality of MH components may be included in a single software module and/or hardware components. Additional and/or alternative MH components, as well as interconnections between them, may be used in different embodiments of the invention.

Embodiments of the invention may store frame or GOP data or metadata and/or request or command data or data items, such as for example the example JSON objects provided herein, as well as the various fields and/or parameters included in them, in computer memory (such as for example using metadata handler 420 and/or intra-collection 422 in a MH or receiver computer and/or additional or alternative data stores which may be included in and used by different computer systems described herein). Based on stored request or command data and/or metadata items, and/or based on, e.g., additional calculations and protocols described herein, some embodiments of the invention may thus enable improved video playing over the web by automatically and dynamically arranging a plurality of video frames and/or applying or adjusting appropriate video playing settings or preferences for a given video file or stream, and/or to specific timeframes or time intervals within a file or stream.

Some embodiments of the invention may select and/or arrange and/or analyze video frames, e.g., based on a distinction between I-frames (intra-frames) and P-frames (predicted frames), which may play a significant role in achieving efficient video compression and transmission.

I-frames (also known as keyframes) as referred to herein may be video reference frames that can be decoded independently. That is, an I-frame may contain a complete image representation and may not rely on any other frames for decoding. I-frames may be interspersed at regular intervals within a video stream, providing a base reference for subsequent frames such as, e.g., P-frames. Due to their standalone nature, I-frames may include a larger amount of data compared to other frame types and may thus be relatively computationally costly.

P-frames may be compressed frames that derive their content by referencing the preceding I-frame or P-frame. P-frames may store, e.g., the differences or motion vectors between themselves and the reference frame, resulting in a significant reduction in data size (compared to, e.g., using only independent frames such as I-frames).

By exploiting temporal redundancy, P-frames may achieve compression efficiency by representing the changes or motion between frames rather than duplicating the entire frame. Such dependency on reference frames may thus allow for computationally more efficient video playback and transmission by reducing the amount of data and information needed to reconstruct a set or sequence of frames. Additional or alternative frame differentiation and categorization schemes for achieving computationally viable video playback and/or storage are known in the art and may be used in different embodiments of the invention.

Some embodiments of the invention may selectively apply the protocols and procedure considered herein to particular frame types (such as for example exclusively to P-frames), and/or to specific frames types and depending, e.g., on GOP size and/or on file format and/or on additional parameters, variables or fields that may be included in data or metadata items as described herein.

In one example, a functional relationship between dropped and played frames such as, e.g., described herein may be applied exclusively to P-frames, or to GOPs including more than a predetermined number of P-frames. In another example, embodiments may apply IDF protocols such as described herein exclusively to a particular data store of frames (such as, e.g., to a memory buffer of P-frames separate from intra collection components).

Embodiments of the invention may perform buffer management operations (e.g., using source buffer handler 416 and/or associated components) to arrange or assemble video frames based on stored data and/or metadata, which may allow, for example, performing forward and backward video playback as described herein.

Figure 5:
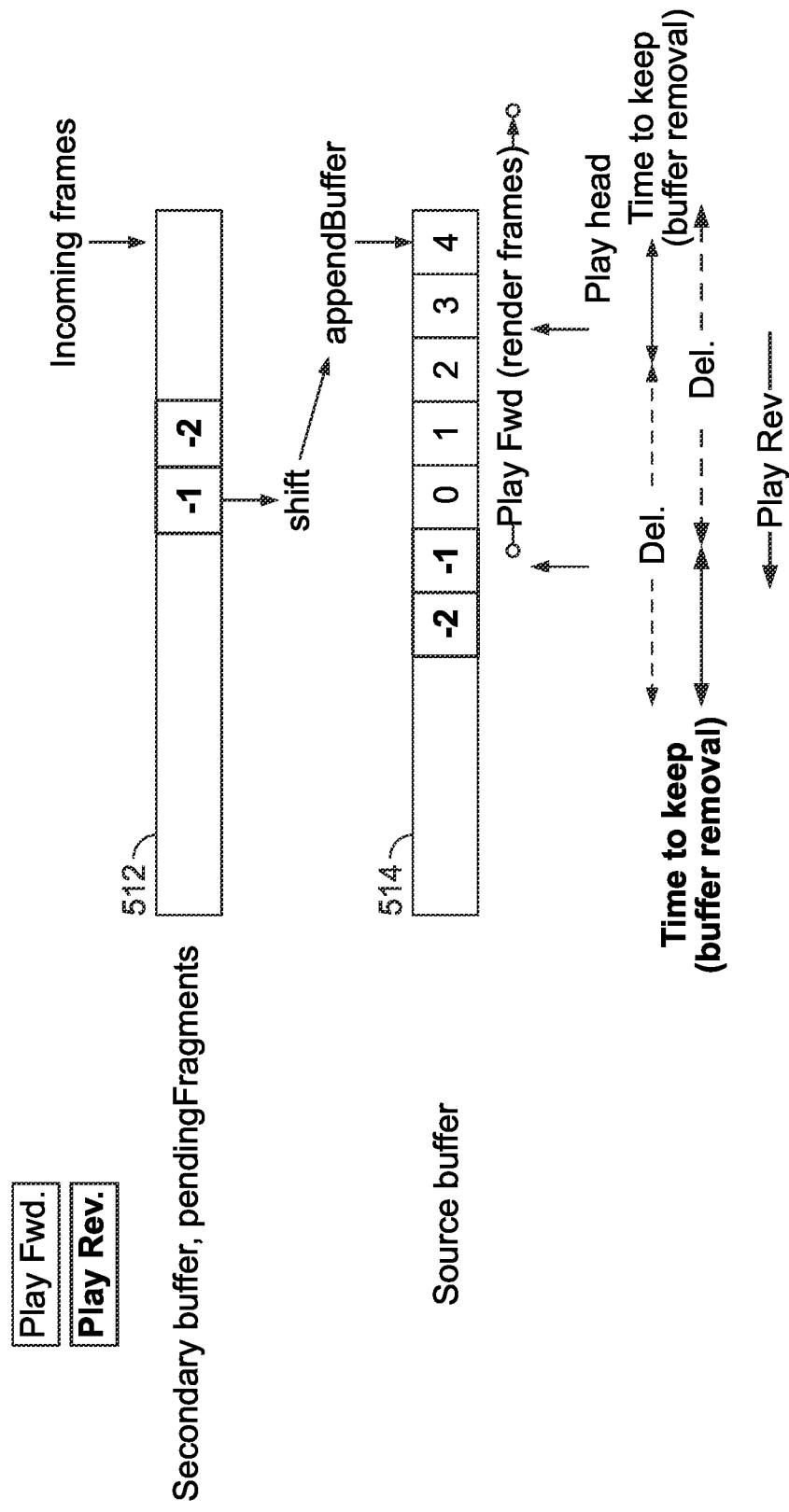
FIG. 5 shows an example buffer management and appending procedure which may be performed by some embodiments of the invention.

FIG. 5 shows an example buffer management and appending procedure which may be performed by some embodiments of the invention. As part of performing video playing operations given or based on appropriate playback settings (which may for example determine or allow immediately initiating video playback in a 'forward' direction—as may be for example described or included in requests or commands and/or frame data or metadata items such as, e.g., discussed herein), embodiments may receive a plurality of video frames or GOPs (e.g., from a sender computer) and store them as pending fragments in a dedicated (e.g., secondary) memory buffer 512 in system memory (which may, e.g., be included in a MH structure and managed by buffer manager 410 as discussed herein). Embodiments may then append source buffer 514—which may for example be the main buffer used for video playing as known in the art—to store or include pending fragments, frames or GOPs included or stored in dedicated buffer 512. In case a forward playback setting, request or command is used for the video under consideration, embodiments may append source buffer 514 in a forward direction, thus arranging or sorting the frames or GOPs in that direction (e.g., as shown in FIG. 5 by consecutive frame numbers). Conversely, if a backward playback setting is used, embodiments may append source buffer 514 in a backward direction, thus sorting or arranging frames or GOPs in the opposite direction (for example, in the case depicted in FIG. 5, two frames numbered '–2' and '–1' stored in dedicated memory buffer 512 may be appended to source buffer 514 such that they may precede the frame numbered '0' in chronological order, and follow this frame if reverse playback is executed). In such manner, some embodiments of the invention may arrange frames independently from the order or arrangement in which video frames or fragments may be received, e.g., from a sender computer or streamer server. As part of arranging video frames or GOPs, some embodiments of the invention may thus for example receive and include a plurality of video frames in a first memory buffer (such as, e.g., dedicated buffer 512), and append a second memory buffer (such as, e.g., source buffer 514) with frames included in the first memory buffer—for example based on a requested video playing direction (as may, for example, be expressed in video data or metadata or in video playing requests or commands such as, e.g., described herein).

As part of arranging frames (e.g., based on data or metadata items), embodiments of the invention may remove, drop, omit, or delete frames no longer used or usable from source buffer 514 or dedicated memory buffer 512 based on appropriate conditions or criteria. For example, embodiments may remove a given frame from source buffer 514 (or, e.g., from dedicated buffer 512) once a predetermined number n of subsequent frames were played according to the playback direction (e.g., forward or backward) included in the playback settings; in the example depicted in FIG. 5, a predetermined n=5 may be used. Different values and/or frame storing or deleting conditions or criteria may be used in different embodiments of the invention.

Some embodiments may allow for reverse video playback using a dedicated or secondary buffer (such as for example dedicated buffer 512). In previous systems and methods (such as for example ones included as part of the HTML 5 video element) frames may generally be rendered in the same order as they are being received and decoded, which may make reverse video playing complicated and computationally burdensome. That is, in such previous systems and methods, the structure of the coded video may be that of consistent GOPS, namely an I-frame may always be received and processed or decoded before its set of subsequent P-frames). Such a GOPS principle or approach may be illustrated in Eq. 1:

$$[\text{Ippppp}] \rightarrow [\text{Ippppp}] \rightarrow [\text{Ippppp}] \rightarrow [\text{Ippppp}] \quad \text{(Eq. 1)}$$

Where four consecutive GOPS, each including an I-frame and several corresponding P-frames (denoted simply as 'p'), may be received and decoded and rendered in chronological order. In case a user attempts to play a given video item in reverse, previous systems and methods may require first processing the entire video item in the order described in Eq. 1—e.g., both decoding and rendering all relevant frames—before performing additional processing operations relating to reverse playback, which may prove computationally costly and burdensome.

Instead of processing the entire video data item, e.g., in a forward direction such as for example according to Eq. 1, in order to enable reverse playing—some embodiments of the invention may, for example, request (e.g., using an appropriate command such as described herein) to receive and process a plurality of frames directly in reverse order (e.g., from a sender computer receiving and interpreting the command), and store them in a dedicated buffer (such as, e.g., dedicated buffer 512) from which they may subsequently be arranged in a separate buffer (such as for example source buffer 514) and rendered.

In one example, a receiver computer R may send a command C to a sender computer S, where C specifies reverse video playback. In such case, S may encode video frames or fragments in a backward direction, and send or transmit them to R for processing (in such an example, R may not need to use a secondary buffer for rearranging frames received from S). In another example, R may send a command C to a sender computer S, where C specifies that S may send or transmit R a plurality of decoded frames. Such decoded frames may then be received by R and stored in a second or dedicated buffer (such as for example dedicated buffer 512). R may then arrange or rearrange the received frames by appending source buffer 514 in any preferred direction or order (such as, e.g., may be appropriate for forward or backward playback, as well as using alternative orderings which may for example be specified by R, e.g., in settings used by a MH component such as described herein).

As part of arranging or rearranging video frames, some embodiments of the invention may include intelligent frame dropping (IFD) and/or intelligent latency control (ILC) techniques such as for example described herein to automatically alter or modify the number of frames played at a given playback speed and/or automatically adjust the playing speed based on the number of frames available in system memory, thus optimizing and balancing computational efficiency and video playback or playing quality and/or timing. Embodiments may select or choose video frames that may be dropped or omitted from a video stream while inducing, for example, minimal impact on playback quality and/or timing. Embodiments may subsequently omit, drop or remove the selected frames from the video stream and/or underlying buffers such that the rendering and playing of a video file or stream by embodiments of the invention do not include the selected, dropped, or omitted frames, or such that selected frames may not be processed, rendered, or played (that is, in contrast to, e.g., unselected frames)—and such that a desirable, optimized balance is achieved between video quality and processing or computational cost.

Some embodiments of the invention may calculate a frame drop factor (FDF) which may determine the number of frames to be dropped or omitted, e.g., in a given time interval, based on or given a selected playback speed or rate. In some embodiments, the FDF may be calculated, for example, based on Eq. 2:

$$D = F - (F \times S^{-1}) \quad \text{(Eq. 2)}$$

Where 'D' is the number of frames to be dropped per period or time interval, 'F' is the original number of frames in the video in that time interval and 'S' is the playback speed. Embodiments of the invention may then remove, delete, drop, or omit a plurality of frames or GOPs from the video file or stream based on the calculated or obtained frame drop factor—such as for example according to additional frame selection protocols and procedures described herein. One skilled in the art may recognize, however, that various formulas and approaches may be used for calculating FDF in different embodiments of the invention.

Figure 6:
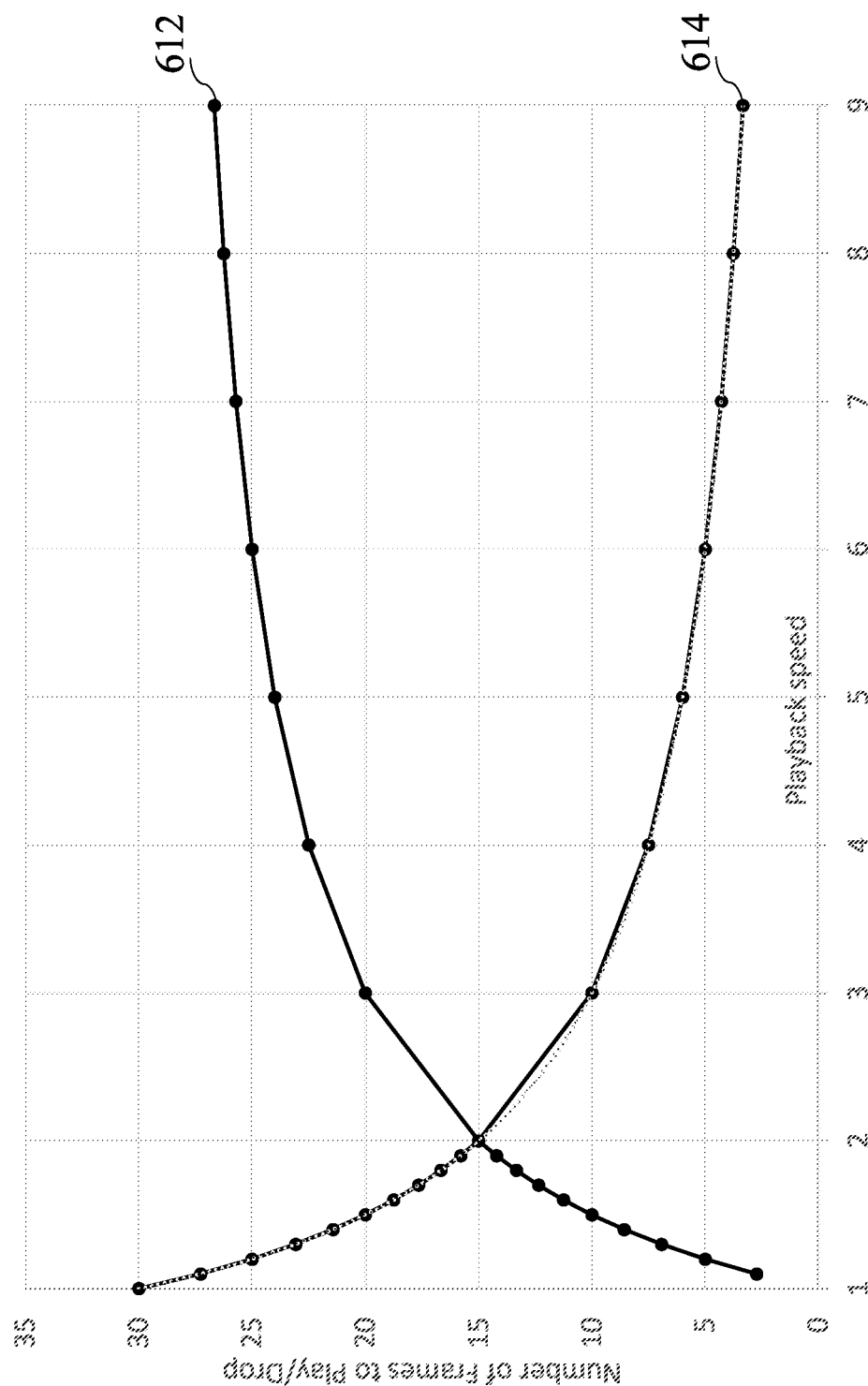
FIG. 6 is a graph of an example relationship between a number of played and dropped frames and a given playback speed according to some embodiments of the invention.

FIG. 6 is a graph of an example relationship between a number of played and dropped frames and a given playback speed according to some embodiments of the invention. Based on a formula such as, e.g., provided in Eq. 2, embodiments may require a functional relationship (which may, e.g., obey a power law) between the number of dropped frames, or number of frames that may be dropped 612, and/or played frames or number of frames that may be played 614 (the formula for which may be inversely-related to that of the dropped frames)—with respect to the playback speed (shown herein in multiples of the original playback speed for a given video item; e.g., a playback speed of 2 refers to twice the video's original playback speed, and so forth). In such a manner, the number of dropped frames 612 (or played frames 614) may increase (or decrease) steeply within a playback speed range of 1-2; while at higher playback speeds the curve may become shallow and reach an optimum or asymptotic value of 27 (or 3, respectively) around a playback speed of 9. Some embodiments of the invention may thus drop or play a plurality of video frames based on a functional relationship such as calculated and depicted in FIG. 6. It should be noted that additional or alternative relationships between a calculated number of frames to be played/dropped and a corresponding playback speed may be included and/or used in different embodiments of the invention.

In some embodiments of the invention, a particular relationship between played (and thus, e.g., arranged) frames and dropped frames may be determined based on request or command and/or frame or GOP data or metadata. In one example, some embodiments may drop 3 frames and play 27 frames, e.g., of a 30 FPS video segment or stream in a video resolution of 1080p given a playback speed of 1.5—and/or drop 7 frames and play 3 frames, e.g., of a 30 FPS video segment or stream in a video resolution of 480p for the same playback speed (such difference in played or dropped frames may be desirable, e.g., because dropping frames in a lower resolution video may lead to a less apparent impact on user experience than dropping frames in a higher resolution video).

Some embodiments of the invention may include or involve intelligent frame selection protocols and procedures that may e.g., be used for deciding which video frames should be played or dropped, thus allowing for further optimization of processing and computational cost with reference to desirable performance considerations.

Let $A_1$ denote the set of indices of selected frames for a period or time interval j (which may, e.g., amount to a single second in length), and $a_k^j$ denote indices k=1, 2 . . . K of the selected frames for interval j. For example, given K=2, and the selected frames within j are frames number 5 and number 28 (e.g., of 30 frames per second) then $A_j = \{a_1^j = j(5), a_2^j = j(28)\}$. In some embodiments of the invention, the last selected frame of the previous or preceding interval (j−1) and a first predicted selected frame $\hat{a}_1^{j+1}$ of the following or subsequent interval j+1 may be added to the set of selected frames for j, such that, e.g.:

$$A_j = \{a_K^{j-1}, a_{k=1,2,\ldots,K}^j, \hat{a}_1^{j+1}\} \quad \text{(Eq. 3)}$$

where $\hat{a}_1^{j+1}$ may be calculated, e.g., based on a ratio between all frames N and the number of selected frames K, or frames to be selected within time interval j:

$$\hat{a}_1^{j+1} = \lceil N/K \rceil - 1 \quad \text{(Eq. 4)}$$

Thus, prior to frame selection for j, $A_j$ may consist of two members $a_K^{j-1}$ and $\hat{a}_1^{j+1}$, while following frames selection $A_1$ may consist of K+2 members.

In another example, consider N=30, K=3, $a_K^{j-1}$=28, and $\hat{a}_1^{j+1}$=9. Prior to frame selection for j, $A_j$ may thus include {−2, 39}. Given that, for example, frames{5, 14, 30} were subsequently selected within j, $A_j$ may be updated to include {−2, 5, 14, 30, 39}.

Embodiments may analyze a plurality of video frames, such as for example P-frames, e.g., by their pre-decoding properties, and measure or calculate an information score for each of the frames considered to describe or quantify an amount of information included or contained in that frame, or an amount of information that may be lost if a given frame is omitted from a set of frames or GOPs to which it may belong. In some embodiments, such an amount of information may be considered, for example, with respect to the frame that precedes it (such that frames describing or associated with, for example, significant motions of various objects may be prioritized with respect to frames associated with relative image stillness). In some embodiments, information scores may be calculated, e.g., according to Eq. 5:

$$M_i^j = s_i^j \quad \text{(Eq. 5)}$$

where $s_i^j$ is the size (e.g., in bytes) of the decoded frame i, or the "frame size" of i, (which may be, e.g., a P-frame) in time interval j (which may, e.g., be included in frame or GOP metadata items such as for example described herein). In some embodiments, I-frames may be given a default score of '0', since, as discussed herein, an I-frame may be considered a frame of reference for considering all information included in P-frames, and thus cannot be compared to the latter. Additional or alternative formulas may be used, e.g., to describe or represent a degree of motion inside a given frame and may therefore be used as, or as part of, information scores calculated using different embodiments of the invention.

In some embodiments, frames may be given, or be associated with, a dispersion score that may describe, reflect, or measure a distribution of the frames within a given time interval, or a clustering or grouping of frames selected to be dropped within such an interval—for example based on calculating or measuring distances between consecutive frames, or between various frames and a reference frame, in order not to drop too many sequential frames and in order to prevent noticeable playback gaps, which might result in "jittery" video playback and a hampered user experience. In some embodiments, dispersion scores may be defined, e.g., as the minimum of the distances of a given frame i (which may or may not be included in $A_j$) from a reference frame or frames selected to be dropped and contained in $A_j$ such as for example may be calculated according to Eq. 6:

$$D_i^a = dist(i, a), a \in A_j \quad \text{(Eq. 6)}$$

where, for example, dist(x,y)=|x−y|, or dist(x,y)=(x−y)² (where x and y may, for example, represent the time within a video in which a frame is to be played, such that distance may be measured in time between frames)—although additional or alternative distance formula or function, as well as additional factors or weights may be used as part of a dispersion score in different embodiments of the invention.

In some embodiments, dispersion scores may be calculated for frames selected for a time interval j, and thus dropping or omitting frames based on, e.g., dispersion scores as discussed herein may be performed for time interval j. In some embodiments of the invention, and as discussed with reference to Eqs. 3-4, it may be useful to include, in a set of selected frames for a first time interval j, one or more frames included in a second, different time interval or time intervals, such as, e.g. intervals, j−1 and/or j+1—such that a dispersion score may reflect the distance of a frame i that may be selected for time interval j from reference frames that may be selected in time intervals j−1 and j+1. Embodiments may thus prevent selecting and dropping frames in a manner that may produce large gaps between played frames, e.g., within and/or across consecutive time intervals. For example, dispersion scores $$D_i^{a_K^{j-1}} \text{ and } D_i^{\hat{a}_1^{j+1}}$$

may be calculated for a frame i, to measure or quantify the distance of frame i from frames $$a_K^{j-1} \text{ and } \hat{a}_1^{j+1}$$

included in $A_j$. Frame i may for example be added to $A_j$ if $$D_i^{a_K^{j-1}} \text{ and/or } D_i^{\hat{a}_1^{j+1}}$$

are above or below a predetermined threshold value (such as for example a distance of 5 frames of 0.5 millisecond), or if i is a frame among a plurality of frames which, for example, maximizes or minimizes $$D_i^{a_K^{j-1}} + D_i^{a_1^{j+1}}.$$

Different conditions and/or criteria for selecting frames or sets of frames based on dispersion scores may be used in different embodiments of the invention.

Some embodiments of the invention may select frames to be dropped from a video file or steam based on, for example, a calculated number of frames to be dropped (as provided, for example, by Eq. 2 and corresponding discussion herein), and/or calculated or obtained information scores, and/or dispersion scores—as well as based on additional request or command and/or frame or GOP data or metadata as described herein. Dropped frames may accordingly not be processed, rendered or played, or not included in rendering or playing of a video file or stream, which may allow for, e.g., automatically adjustable and computationally economical video playback protocols and procedures.

Embodiments of the invention may accordingly provide an iterative method to select K frames out of N frames within a given time interval (e.g., one second). To select K frames from the N frames of time interval j, embodiments may iteratively perform, each time another frame is selected (e.g., K times), such that, e.g., at each iteration t, operations such as:

(i) For each candidate frame i of N which has not been selected yet (e.g., i≤N, i∉$A_j$), embodiments may calculate a dispersion score $D_i$—using, e.g., $$D_i^a$$

in Eq. 6.

(ii) For each candidate frame i of the previous step, embodiments may calculate an information score information score $$M_i^j -$$

using, e.g., Eq. 5 herein.

(iii) Embodiments may then normalize each of the dispersion scores for candidate frames, e.g., using a maximum or mean scores such as for example:

$$\overline{D}_j = \frac{1}{N-t}\sum_{i \notin A_j} D_i, \tilde{D}_t^J = D_i/\overline{D}_j \qquad \text{(Eq. 7)}$$

Where t may be an iteration number (e.g., t=0 for the 1$^{st}$ iteration of the algorithm, t=1 for the second iteration, and so forth), $$\tilde{D}_t^J$$

may be a normalized dispersion score and 1/$\overline{D}_j$ may be used as a normalization factor (it should be noted, however, that different normalization procedures or factors may be used in different embodiments of the invention).

(iv) Embodiments may normalize each of the information scores for candidate frames—e.g., using a normalization protocol similar to the one used in the previous step, such as for example:

$$\overline{M}_j = \frac{1}{N-t}\sum_{i \notin A_j} M_i^j, \tilde{M}_i^j = M_i^j/\overline{M}_j \qquad \text{(Eq. 8)}$$

where $\widetilde{M_i^J}$ is a normalized information score and 1/$\overline{M}_j$ may be used as a normalization factor (again, different normalization procedures or factors may be used in different embodiments of the invention).

(v) Embodiments may then calculate a weighted or combined score for the candidate frames under consideration: Let a be a weight assigned to information score $\widetilde{M_t^J}$, β a weight assigned to dispersion score $\widetilde{D_t^J}$ such that, e.g.:

α+β=1,α≥0,β≥0 (Eq.9)

Although different weighting or scaling approaches may be used in different embodiments. The combined score $f_i^j$ for candidate frame i may thus be, for example:

$$f_i^j = \alpha\tilde{M}_i^j + \beta\tilde{D}_i^j \qquad \text{(Eq. 10)}$$

(vi) Embodiments may then select the candidate frame I for which the maximal combined score was calculated, e.g., according to:

I=argmax$_i$($f_i^j$) (Eq.11)

and update set $A_j$ accordingly (add I to the set).

Embodiments may then return to step (i) to initiate iteration t+1.

In some embodiments of the invention, an iterative frame selection process such as for example outlined herein may be terminated, e.g., based on a calculated FDF (such as for example provided in Eq. 2, requiring that the final iteration may be t(K), where K=D).

Various constraints, conditions, or criteria may be combined or included in frame selection protocols or procedures according to embodiments of the invention (such as for example the iterative process described herein).

In one example, first iterations of the iterative frame selection process or protocol (e.g., where no frames within time interval j were selected, or where only a small number of frames, such as for example below a predetermined threshold of, e.g., 3 frames, were selected) may be modified to apply constraints or criteria for preferred, initial frame selections. In such case, e.g., iteration t=1 may include or involve, for example:

Requiring a frame to be selected from specific options or subintervals within the time interval, according to formulas such as for example $$A_j = \left[1, \frac{N}{K+1}\right], \text{ or } A_j = \left[N - \frac{N}{K+1}, N\right],$$

and the like.

Selecting frames based only on, e.g., information scores while neglecting dispersion scores (thus omitting, e.g., steps (i) and (iii) from t=1, or from a few first iterations of the frame selection protocol, or setting β in step (v) to zero).

One skilled in the art would recognize that additional conditions or criteria, involving, for example, various logical and/or quantitative factors for video frame selection for enabling computationally efficient video playback may be used in different embodiments of the invention.

Some embodiments of the invention may choose or select the frames (e.g., as part of IFD protocols and procedures such as for example discussed herein) at once—rather than, for example, doing so in an iterative manner—e.g., by representing and/or computing the frame selection per each time interval j as a solution to an optimization problem. In one example, it is possible to formulize the problem of selecting or choosing k frames per each interval j of frames of duration N, as, e.g., a binary integer optimization problem (although other types of optimization problems may be used in different embodiments of the invention).

For each examined interval j, let us define the binary decision variables $X_i$, where, e.g., $1 \leq i \leq N$, and where $X_i$ may be set to equal 1 if a frame i is selected, and otherwise be set to equal zero (e.g., $X_i \in \{0, 1\}$). One example optimization problem could be formulized as, e.g., selecting the K frames which satisfy:

$$\text{maximize } \alpha \sum_{i=1}^{N} M_i X_i + \beta D(X_1, \ldots, X_N) \quad \text{(Eq. 12)}$$

$$\text{subject to } \sum_{i=1}^{N} X_i = K,$$

$$\text{and } X_i \in \{0, 1\}$$

where $M_i$ may be an information measure or score of frame i such as, e.g., described herein; α and β may be weights or coefficients such as, e.g., as defined in Eq. 10; and D $(X_1, \ldots, X_N)$ may be a dispersion measure or score measuring, for example, a distribution of frames within a time interval, such as for example described herein, or a score that may, e.g., assign high or large values to selection of frames distributed uniformly over interval j.

An example dispersion measure or score (which may, e.g., be used for treating or considering frame selection as a linear optimization problem) may be the number of alterations or changes between 0 and 1 values in the set or sequence $\{X_1, \ldots, X_N\}$ of decision variables for the K selected frames. For example, in the sequence $\{X_1, =1, X_2, =0, X_3, =1, X_4, =1, X_5=0, X_6=0\}=\{1,0,1,1,0,0\}$, one "change" may exist between $X_1$, having a value of 1 and $X_2$ having a value of 0; another change may exist between $X_2$, having a value of 0 and $X_3$, having a value of 1; and another change may exist between $X_4$, having a value of 1 and $X_5$, having a value of 0. Such a dispersion measure may be useful, e.g., in some embodiments of the invention where the number of selected frames is at least half the number of frames in a time interval (such as, e.g., K≥N/2) and may be formulated or expressed as follows:

$$D(X_1, \ldots, X_N) = \sum_{i=2}^{N} X_i(1 - X_{i-1}) + \sum_{i=2}^{N} (1 - X_i)X_{i-1} = \quad \text{(Eq. 13)}$$

$$\sum_{i=2}^{N} X_i + X_{i-1} - 2X_i X_{i-1}$$

Although different expressions and/or formulas may be used in different embodiments of the invention.

In some embodiments, it may be possible to convert or transform one input optimization problem relating, e.g., to frame selection, into another, different optimization problem (which may, e.g., have implications on computational cost and efficiency of frame selection processes and procedures such as outlined herein). For example, some embodiments of the invention may convert or transform an integer quadratic optimization problem (such as e.g. expressed in Eqs. 12-13 which contains products of variables, as known in the art) into, e.g., an integer linear optimization problem—by introducing a helper or auxiliary variable Z such as for example:

$$Z_{ij}=X_i X_j \quad \text{(Eq.14)}$$

and, e.g., by applying various constraints or requirements to the auxiliary variable, such as for example:

$$Z_{ij} \leq X_i,$$

$$Z_{ij} \leq X_j,$$

$$Z_{ij} \geq X_i + X_j - 1 \quad \text{(Eq.15)}$$

When integrated into, e.g., Eq. 13, using $Z_i = X_i X_{i-1}$ and requiring $2 \leq i \leq N$, this may result, e.g., in a linear optimization problem (which may be free of products of variables and include only sums of variables) such as, e.g.:

$$\text{maximize } \alpha \sum_{i=1}^{N} M_i X_i + \sum_{i=2}^{N} X_i + X_{i-1} - 2Z_i \quad \text{(Eq. 16)}$$

$$\text{subject to } \sum_{i=1}^{N} X_i = K,$$

$$X_i \in \{0, 1\},$$

$$Z_i \leq X_i \quad 2 \leq i \leq N,$$

$$Z_i \leq X_{i-1},$$

$$\text{and } Z_i \geq X_i + X_{i-1} - 1$$

Different optimization problems as well as transformations and/or conversions of optimization problems of various types, using, e.g., additional or alternative auxiliary variables, may be considered or used in different embodiments of the invention. In this context, and in order to solve various optimization problems, different embodiments of the invention may use or include various computational optimization algorithms such as, e.g., the Gradient Descent algorithm and/or the Newton-Raphson algorithm—as well as additional or alternative computational optimization algorithms known in the art.

Playing video items (such as for example live video streams) with low latency is a long-standing challenge in the art of web-based video playing. In this context, embodiments may provide an intelligent latency reduction protocol or mechanism (referred to herein as ILC) that may accelerates the video's speed whenever there is an accumulation of frames that have not yet been processed or played in computer memory (such as for example source buffer 514 or dedicated buffer 512).

Some embodiments of the invention may thus automatically adjust a video playing speed based on a video acceleration database or table, which may associate various playing rates with numbers of accumulated frames within the system's corresponding memory buffers. The number of frames in a given buffer (such as for example dedicated buffer 512 or source buffer 514) may be sampled, for example, at a predetermined frequency (such as for example every 5 seconds), and an acceleration level or playing speed may be determined according to a database (which may be, for example, in a table format) that allocates, determines, or associates playing rates to numbers of frames accumulated in a memory buffer and/or a specific speed to different levels of latency while, e.g., taking a functional relationship between frames to be played and playback speed such as, e.g., illustrated in FIG. 6, into account. For example, an ILC protocol may include or involve a latency-acceleration table such as for example illustrated in the example data in Table 1:

TABLE 1

| Number of Frames in Buffer: | Acceleration (x times original playing speed): |
|---|---|
| 5 | 1 |
| 7 | 1.2 |
| 8 | 1.3 |
| 12 | 1.5 |
| 50 | 1.8 |

In some embodiments of the invention, ILC protocols and procedures may be combined with IFD protocols, e.g., to drop or play a plurality of video frames (which may be, e.g., accumulated in a corresponding memory buffer) according to an appropriate video playing speed as described herein. Following the adjusting of a playing speed based on, e.g., an ILC protocol such as for example described herein—which may result, for example in arranging video frames or GOPs (such as, e.g., based on an IFD protocol)—subsequent rendering and playing of the arranged frames may accordingly be performed based on the adjusted video playing speed. Additional or alternative ILC protocols and procedures, as well as data formats for determining an acceleration level based on a number of accumulated video frames may be used in different embodiments of the invention.

In some cases, e.g., where there is an accumulation of frames (e.g., where the buffer includes a number of frames n larger than a predetermined value, e.g., of 100 frames), some embodiments may delete or flush the relevant buffer and video playing may be suspended until newly-received frames may be stored and played.

In some embodiments of the invention, a plurality of computer systems (such as for example sender computers, receiver computers, and recorders) may operate and/or communicate, e.g., in parallel in order to enable, for example, synchronous live video streaming or video playback on multiple devices. In some embodiments, video playing adjustments (as may be, for example, associated with or expressed in arranging or rearranging of video frames or GOPs such as, e.g. described herein), and/or adjustments of video playing speeds such as for example described with regards to the various protocols and procedures outlined herein may be performed based on a reference video playing, or based on reference video playing operations, of a remote computer (as may be associated with, or expressed in, video data or metadata items or in video requests and commands such as, e.g., described herein).

For example, given a command C1 for video playback from a first receiver computer R1 to a sender computer S, where C1 includes, e.g., a specified execution time—sender computer S, which may store a plurality of video playing commands, messages, or requests, and/or frame data or metadata by a plurality of computer systems as described herein, may for example edit a command C2 sent by a second receiver computer R2, e.g., such that execution time may refer to, or may be set or linked with the relevant identifier of the first receiver computer R1, (which may be, e.g., Media_Requester_ID) of command C1 or with the first receiver computer R1 as follows: Command C2{

. . .

Execution_time=[Execution_time (C1)]

In another example, sender computer S may communicate with receiver computers R1 and R2, for example at each timeframe or time interval (such as for example 5 seconds), to receive the number of frames accumulated (and, e.g., not yet played) in corresponding memory buffers for each of R1 and R2, which may for example be included in a corresponding command, message, or request and/or data or metadata item as described herein. Based on the received number of pending frames for, or referring to, R1 and R2, S may for example apply some of the protocols and procedures discussed herein to synchronize video playing between R1 and R2, or to enable video playing in R2 which may synced (e.g. to adjust or set the playing speed), e.g., with reference or with respect to video playing on R1 (for example by sending appropriate commands or requests to update a plurality of video playing settings or preferences, and/or to apply IFD and ILC protocols such as described herein).

In another example, some embodiments of the invention may use a dedicated buffer (such as, e.g., buffer 512) to enable synchronous video playing, or syncing different video playing systems to a precise time, for example by using the various requests and/or commands in combination with IFS and/or ILC protocols and procedures such as, e.g., described herein. For instance, two receiver computer systems R1 and R2 may be playing the same video item or file which may be transmitted and received by sender computer S. R2 may store a plurality of frames or GOPs in a dedicated buffer which may be, e.g., separate from a source buffer used for video playing. Given metadata item M sent or transmitted from R1 to S, where M may include a frame number or timestamp describing a given frame F with a video item or file played within the video item or file—sender computer S, which may store a plurality of information items as described herein, may for example send a command C to a second receiver computer R2 to accelerate playback speed, and/or to select and/or play and/or drop a plurality of frames stored in the dedicated buffer, e.g., according to the various protocols and procedures discussed herein—such that video playing on R2 may be adjusted to play F in sync with, and/or with reference to, video playing on R1 (for example by dropping frames or changing playing speed such that R2 may arrive at F at an appropriately short time). It should be noted that additional or alternative protocols and procedures for synchronous video playback, e.g., ones taking video requester hardware specifications into account and including, e.g., ILC and/or IFD protocols and procedures as described herein may be used in different embodiments of the invention.

Some embodiments of the invention may perform a plurality of processing operations, such as for example video masking and overlay operations, on a plurality of video frames or GOPs prior to their rendering. Masking information as described herein may, for example, refer to a "filter" and/or visual effects which may be applied to a video file or stream and/or to its underlying frames or GOPs using or based on, e.g., facial or object recognition approaches and procedures such as, e.g., ones implemented, inter alia, in a variety of video-related computer programs and/or mobile phone applications or platforms—including, for example, the Zoom platform or the Snapchat platform, among a great many other examples (it should be noted, however, that different object recognition techniques may be used in different embodiments of the invention). One example use case of masking may relate to data and information security: in this context, masking as performed by embodiments of the invention may, e.g., hide a portion of a captured screen which may contain sensitive information (for example, embodiments may automatically identify a keypad on an ATM machine shown in a video stream, where a person attempting to take out cash may be typing a security code while intending to keep it secret, for obvious reasons). Other use cases of video masking may be considered in different embodiments.

In some embodiments, a plurality of frames or GOPs may be transmitted from sender computer S and received by a receiver computer R1, e.g., according to a plurality of video playing requests and/or commands as described herein. R1 may then perform masking operations on the received frames, for example by editing and/or writing or overwriting frame data and adding masking information to the frame itself prior to any rendering of the relevant frames or GOPs. Following the adding of masking information to relevant frames or GOPs, or to overwriting frames or GOPs, R1 may then render the relevant frame or GOP, and/or send or transmit the relevant frame or GOP to S and/or to a second receiver computer R2. In some embodiments, masking or overlaying information added or attached to a frame may be implemented in frame data such that it may not be deleted, erased, or removed subsequent to their processing and rendering (thus, S and R2 may not be able to undo or edit masking after frame data was written or overwritten by R1—which may, inter alia, serve R1 in keeping information masked by R1 safe and hidden from S and R2). In other embodiments, masking or overlaying information is added "on top" of a video frame, for example in separate data or metadata items, such that they may, e.g., be processed by a dedicated video playing component or module and be edited, modified, or removed by S or R2. Various additional or alternative video processing and/or masking and/or overlaying operations and protocols may be used or included in different embodiments of the invention, and for example be combined with the plurality of video playing protocols and procedures outlined herein, e.g., as part of an adaptive video playing framework enabling diverse video playing functionalities as discussed herein.

Figure 7:
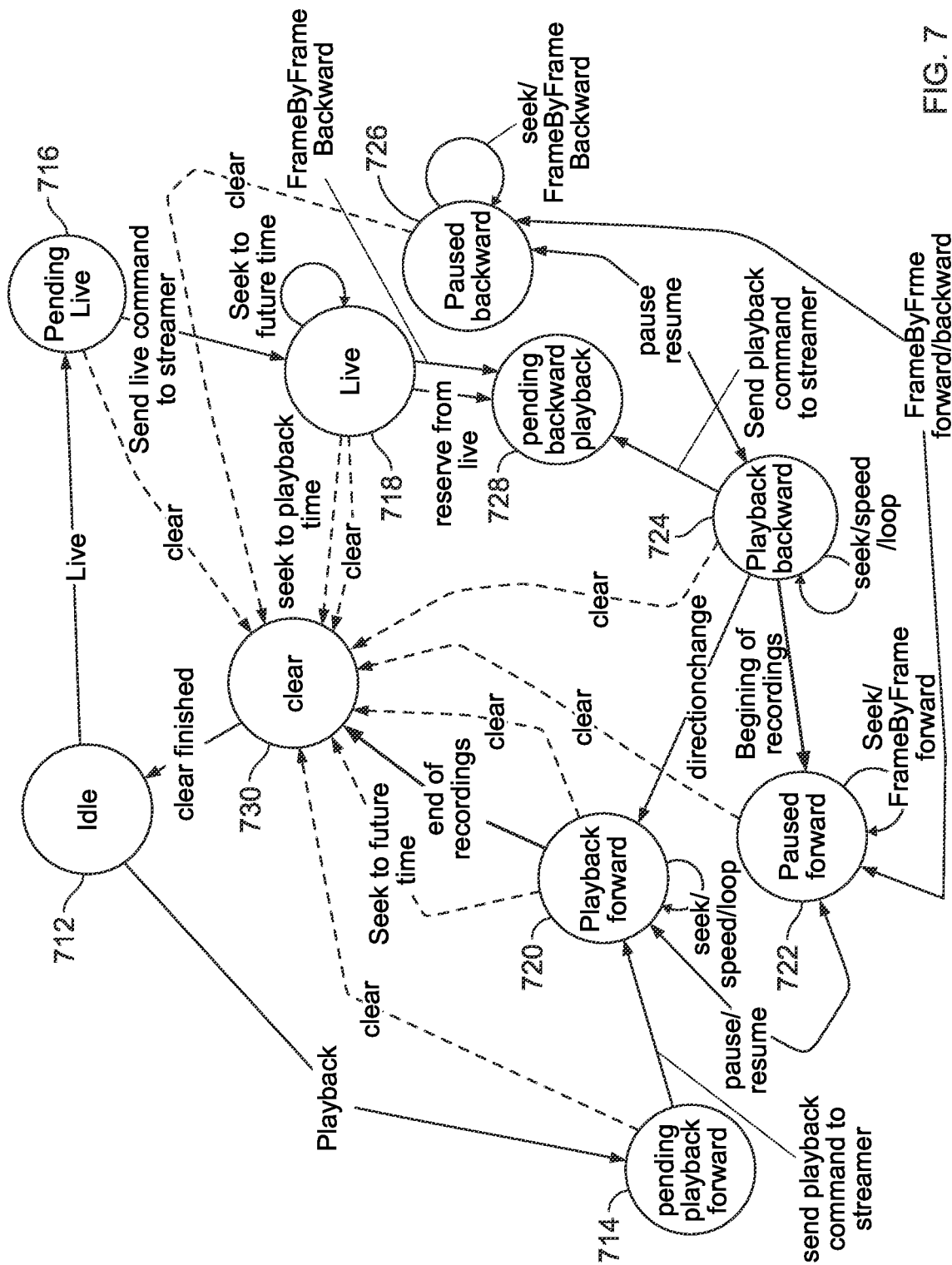
FIG. 7 illustrates a state machine describing an example web based video player according to some embodiments of the invention.

FIG. 7 illustrates a state machine describing an example web based video player according to some embodiments of the invention. It may be seen that, for example, live video streaming or video playback actions may be requested and/or executed (e.g., by a receiver computer such as, e.g., computer 220, which may for example include the video player and/or a corresponding user interface to send commands or requests such as, e.g., described herein) when the player is in an idle state 712. Appropriate requests or commands for live streaming or for playback may then be sent to a streamer server (such as, e.g., a sender computer such as, e.g., computer system 210), which may then change the state of the player to corresponding default pending states (where, for example, the video player may be awaiting video data and/or metadata from a video source or sender) such as, e.g., pending playback forward 714 and pending live 716, respectively.

Subsequently (e.g., at a point where video data is received and stored in system memory, for example, in source buffer 514) the player may transition into a default video playing state such as, e.g., live 718 or playback forward 720, respectively. From such default video playing states, additional requests or commands (such as for example to pause/resume, seek, change the speed or direction and/or loop of the video file, etc.) may further change or alter the state of the player to, e.g., paused forward 722, playback backward 724 paused backward 726, pending backward playback 728, and the like—where playing and/or pending states may for example lead to or result in a clear state 730, in which a corresponding memory buffer in system memory is cleaned, deleted or flushed, e.g., based on appropriate conditions and/or criteria as described herein. It may be seen that additional transition between the various states depicted in FIG. 7 (which may be for example induced by appropriate requests or commands such as, e.g., described herein) may take place; one skilled in the art would further recognize that additional or alternative player states and/or transitions between them may be used or included in some embodiments of the invention.

Some previous video playback systems and methods provided no single, standardized approach for playing video content within a web page. Such lack of standardization is known to pose various challenges—including, e.g., inconsistency or lack or coherency of video content when played using different internet browsers (such as Google Chrome, Mozilla Firefox, etc.) which may introduce, e.g., inconsistent user experiences across different browsers; video playing methods being, rigid "black boxes" and not enabling, e.g., user control over frame processing and rendering, and restricting real-time manipulation options and dynamic customization of video playback; providing only limited playing options (such as for example enabling only forward playback, as opposed to, e.g., playing videos in reverse, and/or not enabling dynamic synchronization between different video playing entities); and/or operating strictly within a single-threaded environment for generating and displaying web page content and handling frontend actions (which might for example lead to challenges in maintaining a smooth user experience or impact the performance of other video players running in parallel, e.g., on the same computer system).

Embodiments of the invention may be used to allow intelligent and improved live video streaming and video playback, for example, over the web and/or within web pages. As described herein, embodiments of the invention may provide a dynamic and responsive video playing framework, which may allow desirable video playing functionalities while, e.g., balancing computational efficiency, performance and robustness with desirable video quality. Embodiments may thus tackle the various deficiencies of previous systems and methods by providing a standardized, robust, dynamic, and versatile framework for web video playing, which may for example enable dynamic control over frame processing and rendering and supporting coherency across different systems or platforms as described herein.

Figure 8:
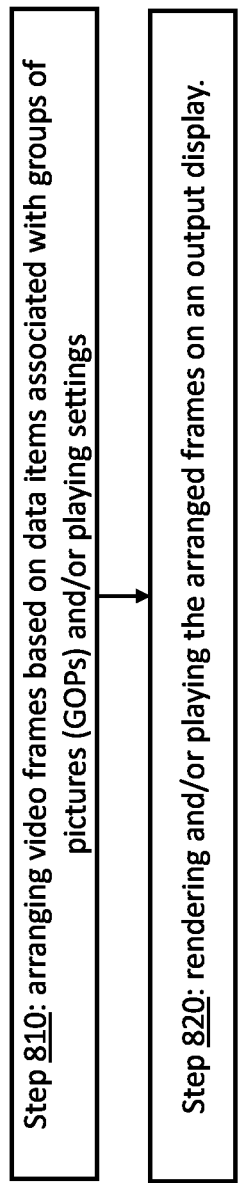
FIG. 8 is a flowchart depicting an example method for intelligent video playing according to some embodiments of the invention.

FIG. 8 is a flowchart depicting an example method for intelligent video playing according to some embodiments of the invention. In step 810, embodiments of the invention may arrange a plurality of video frames or GOPs based on a plurality of data or metadata items, and/or based on a plurality of commands, messages or requests which may be associated with one or more GOPS and/or video playing settings (and may, e.g., be sent or transmitted to or from a remote computer such as for example a sender computer or a recorder system) as described herein. Embodiments may then render and/or play the arranged frames or resulting video stream or sequence on an output display (step 820).

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method for intelligent video playing, the method comprising:
   in a computerized system comprising a memory and a computer processor:
   arranging, by the processor, a plurality of video frames based on one or more data items, the data items associated with one or more groups of pictures (GOPs) and one or more video playing settings, wherein one or more of the frames are included in a first memory buffer, and wherein the arranging comprises appending, by the processor, a second memory buffer with one or more of the frames included in the first memory buffer, the appending based on a requested video playing direction; and
   rendering and playing, by the processor, the arranged video frames on an output display.

2. The method of claim 1, comprising automatically adjusting, by the processor, a playing speed based on a video acceleration database, the database associating a plurality of playing rates to numbers of accumulated frames within one or more memory buffers; and
   wherein the playing of the arranged video frames is performed based on the adjusted playing speed.

3. The method of claim 1, wherein the arranging comprises omitting, by the processor, one or more of the frames; and
   wherein the rendering and playing do not include the omitted frames.

4. The method of claim 3, comprising calculating, by the processor, a frame drop factor, the factor determining, for a given playing speed, a number of frames to be omitted; and
   wherein the omitting of one or more of the frames is performed based on the frame drop factor.

5. The method of claim 3, comprising:
   for one or more of the frames, calculating, by the processor, an information score, the information score quantifying an amount information lost if a given frame is omitted from a set of frames; and
   wherein the omitting of one or more of the frames is performed based on the information scores.

6. The method of claim 5, wherein the information score comprises a frame size, and wherein the method comprises normalizing, by the processor, each of the information scores.

7. The method of claim 5, comprising:
   calculating, by the processor, a dispersion score for one or more of the frames, the dispersion score measuring a distribution of one or more of the frames within a time interval;
   wherein the omitting of one or more of the frames is performed based on the information scores and based on the dispersion scores.

8. The method of claim 7, wherein the dispersion score includes a distance between one or more of the frames and a reference frame; and
   wherein the omitting of one or more of the frames is performed for a first time interval, and wherein the reference frame is in a second time interval.

9. The method of claim 2, wherein the adjusting of a playing speed is performed based on a reference video playing of a remote computer.

10. A computerized system for intelligent video playing, the system comprising:
    a memory,
    and a computer processor configured to:
    arrange a plurality of video frames based on one or more data items, the data items associated with one or more groups of pictures (GOPs) and one or more video playing settings, wherein one or more of the frames are included in a first memory buffer, and wherein the arranging comprises appending a second memory buffer with one or more of the frames included in the first memory buffer, the appending based on a requested video playing direction; and
    render and play the arranged video frames on an output display.

11. The computerized system of claim 10, wherein the processor is to:
    adjust a playing speed based on a video acceleration database, the database associating a plurality of playing rates to numbers of accumulated frames within one or more memory buffers; and
    wherein the playing of the arranged video frames is performed based on the adjusted playing speed.

12. The computerized system of claim 10, wherein the arranging comprises omitting one or more of the frames; and
    wherein the rendering and playing do not include the omitted frames.

13. The computerized system of claim 12, wherein the processor is to:
 calculate a frame drop factor, the factor determining, for a given playing speed, a number of frames to be omitted; and
 wherein the omitting of one or more of the frames is performed based on the frame drop factor.

14. The computerized system of claim 12, wherein the processor is to:
 for one or more of the frames, calculate an information score, the information score quantifying an amount information lost if a given frame is omitted from a set of frames; and
 wherein the omitting of one or more of the frames is performed based on the information scores.

15. The computerized system of claim 14, wherein the information score comprises a frame size, and wherein the method comprises normalizing, by the processor, each of the information scores.

16. The computerized system of claim 14, wherein the processor is to:
 calculate a dispersion score for one or more of the frames, the dispersion score measuring a distribution of one or more of the frames within a time interval; and
 wherein the omitting of one or more of the frames is performed based on the information scores and based on the dispersion scores.

17. The computerized system of claim 16, wherein the dispersion score includes a distance between one or more of the frames and a reference frame; and
 wherein the omitting of one or more of the frames is performed for a first time interval, and wherein the reference frame is in a second time interval.

18. The computerized system of claim 11, wherein the adjusting of a playing speed is performed based on a reference video playing of a remote computer.

* * * * *